UNITED STATES PATENT OFFICE.

KARL THUN, OF BARMEN, GERMANY, ASSIGNOR TO THE FARBENFABRIKEN OF ELBERFELD COMPANY, OF NEW YORK.

GRAY-BLACK ANTHRAQUINONE DYE AND PROCESS OF MAKING SAME.

SPECIFICATION forming part of Letters Patent No. 623,638, dated April 25, 1899.

Application filed September 23, 1898. Serial No. 691,721. (No specimens.)

*To all whom it may concern:*

Be it known that I, KARL THUN, doctor of philosophy, chemist, (assignor to the FARBENFABRIKEN OF ELBERFELD COMPANY, of New York,) residing at Barmen, Germany, have invented a new and useful Improvement in the Manufacture of Grayish-Black Anthraquinone Dyes; and I hereby declare the following to be a clear and exact description of my invention.

In the specification of Letters Patent No. 599,425, dated February 22, 1898, Robert E. Schmidt has described a process for producing blue-black dyestuffs by condensing two molecules of a primary aromatic amin with one molecule of purpurin and sulfonating the intermediate condensation products thus obtained. The resulting dyestuffs are sulfoacids of bodies having most probably the general formula:

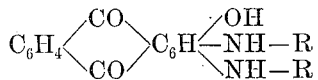

R meaning in this formula an aromatic radical, such as phenyl, tolyl, xylyl, naphtyl, or the like. I have now discovered that very valuable nitro derivatives of these dyestuffs can be obtained by treating the same with one or two molecules of nitric acid in the presence of boric acid. The new products thus obtained are sulfo-acids of bodies having the following general formula:

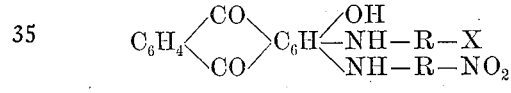

R meaning in this formula the radicals above mentioned, X a hydrogen atom, which may be replaced by a nitro group. These new products are valuable dyestuffs, which yield on chrome mordanted wool from grey to black fast shades. When dry and pulverized, they are dark powders, which dissolve in concentrated sulfuric acid (66° Baumé) with a color varying from red to blue. They are decomposed under regeneration of purpurin when heated with a sulfuric acid of 60° Baumé.

In carrying out my new process practically I can proceed as follows, (without limiting myself to the particulars given:) A concentrated-sulfuric-acid solution of purpurindianilid sulfonic acid is prepared, as described in the above-mentioned Letters Patent, by heating twenty kilos, by weight, of the condensation produced from one molecule of purpurin and two molecules of anilin with two hundred kilos, by weight, of concentrated sulfuric acid (66° Baumé) at about 60° centigrade, until the precipitate obtained by pouring a test portion of the solution into a large quantity of water readily dissolves in boiling water. The concentrated-sulfuric-acid solution thus obtained is mixed with twenty kilos, by weight, of crystallized boric acid, and the resulting mixture is stirred for about half an hour. Subsequently it is cooled to 10° centigrade and slowly mixed (while well stirred) with 15.5 liters of a mixture of concentrated sulfuric acid and concentrated nitric acid, (which contain 3.1 kilos, by weight, of $HNO_3$, corresponding with about one molecule of this acid,) the temperature being kept below 20° centigrade. After stirring for about one hour the liquid is poured into two thousand five hundred liters of water. To the resulting mixture two hundred kilos, by weight, of common salt are added. The new nitro compound is thus precipitated in the shape of brown flakes, which are filtered, pressed, dried, and pulverized. Of course the dyestuff can also be used in a pasty state.

The coloring-matter is a sulfonic acid of a body having most probably the following formula:

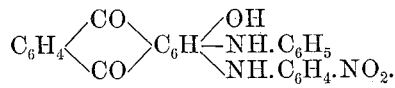

It is a dark powder, which dissolves in concentrated sulfuric acid (66° Baumé) with a violet color. When heated with a sulfuric acid of 60° Baumé, it is decomposed under regeneration of purpurin.

The dyestuff yields on chrome-mordanted wool grayish-black shades, which are fast to fulling, to acids, and against the action of light.

Having now described my invention and in what manner the same is to be performed, what I claim as new, and desire to secure by Letters Patent, is—

1. The process for producing new nitro compounds of the anthraquinone series by first mixing a concentrated-sulfuric-acid solution of sulfonic acids of bodies having the formula

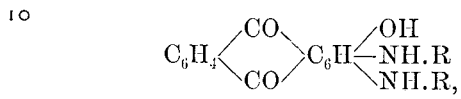

in which formula "R" means an aromatic radical of the series homologous and analogous to "phenyl," with boric acid, secondly adding nitric acid to this mixture which is then stirred for about one hour at from 10° to 20° centigrade, thirdly pouring the reaction mixture into water and finally isolating the new dyestuffs thus precipitated, substantially as hereinbefore described.

2. The process for producing a new nitro-compound of the anthraquinone series by first mixing a concentrated-sulfuric-acid solution of one molecule of a sulfonic acid of purpurin-dianilid having the formula

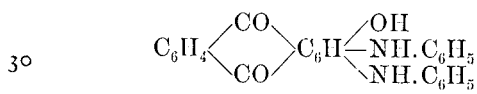

with boric acid, secondly adding one molecule of nitric acid to this mixture which is then stirred for about one hour at from 10° to 20° centigrade, thirdly pouring the reaction mixture into water and finally isolating the new dyestuff thus precipitated, substantially as hereinbefore described.

3. As new articles of manufacture the new anthraquinone dyestuffs, being sulfonic acids of bodies having the general formula

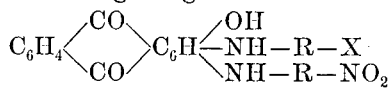

in which formula "R" means an aromatic radical of the series homologous and analogous to "phenyl," "X" a hydrogen atom that may be replaced by a nitro group, which dyestuffs when dry and pulverized are dark powders, soluble in concentrated sulfuric acid of 66° Baumé with from red to blue color, being decomposed under regeneration of purpurin when heated with sulfuric acid of 60° Baumé, yielding on chrome mordanted wool from gray to black fast shades, substantially as hereinbefore described.

4. As a new article of manufacture the new anthraquinone dyestuff being a sulfonic acid of a body having the formula,

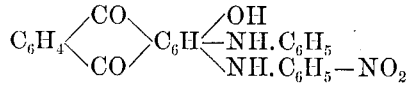

which dyestuff when dry and pulverized is a dark powder, soluble in concentrated sulfuric acid of 66° Baumé with a violet color, being decomposed under regeneration of purpurin when heated with sulfuric acid of 60° Baumé, dyeing chrome mordanted wool grayish-black shades fast to fulling, acids and light, substantially as hereinbefore described.

In testimony whereof I have signed my name in the presence of two subscribing witnesses.

KARL THUN.

Witnesses:
R. E. JAHN,
E. KLOEPPEL.

It is hereby certified that in Letters Patent No. 623,638, granted April 25, 1899, upon the application of Karl Thun, of Barmen, Germany, for an improvement in "Gray-Black Anthraquinone Dyes and Processes of Making Same," an error appears in the printed specification requiring correction, as follows: In line 57, page 1, the word "produced" should read *product;* and that the said Letters Patent should be read with this correction therein that the same may conform to the record of the case in the Patent Office.

Signed, countersigned, and sealed this 13th day of June, A. D., 1899.

[SEAL.]

WEBSTER DAVIS,
*Assistant Secretary of the Interior.*

Countersigned:
C. H. DUELL,
*Commissioner of Patents.*